US010733364B1

(12) United States Patent
Allison et al.

(10) Patent No.: US 10,733,364 B1
(45) Date of Patent: Aug. 4, 2020

(54) SIMPLIFIED FORM INTERFACE SYSTEM AND METHOD

(71) Applicant: dotloop, Inc., Cincinnati, OH (US)

(72) Inventors: G. Austin Allison, Cincinnati, OH (US); Justin Hu, Talmage, CA (US); Daniel Pinciotti, Cincinnati, OH (US)

(73) Assignee: dotloop, LLC, Seattle, WA (US)

( * ) Notice: Subject to any disclaimer, the term of this patent is extended or adjusted under 35 U.S.C. 154(b) by 129 days.

(21) Appl. No.: 14/842,267

(22) Filed: Sep. 1, 2015

Related U.S. Application Data
(60) Provisional application No. 62/044,514, filed on Sep. 2, 2014.

(51) Int. Cl.
| | | |
|---|---|---|
| *G06F 17/00* | (2019.01) | |
| *G06F 40/174* | (2020.01) | |
| *H04L 29/08* | (2006.01) | |
| *G06Q 10/10* | (2012.01) | |
| *G06F 40/106* | (2020.01) | |

(52) U.S. Cl.
CPC .......... *G06F 40/174* (2020.01); *G06F 40/106* (2020.01); *G06Q 10/10* (2013.01); *H04L 67/1097* (2013.01)

(58) Field of Classification Search
CPC .................................................. G06F 17/243
See application file for complete search history.

(56) References Cited

U.S. PATENT DOCUMENTS
| | | | |
|---|---|---|---|
| 4,747,093 A | 5/1988 | Benne et al. | |
| 4,870,576 A | 9/1989 | Tornetta | |
| (Continued) | | | |

FOREIGN PATENT DOCUMENTS
| | | |
|---|---|---|
| KR | 1020020092595 | 12/2002 |
| KR | 1020070059931 | 6/2007 |
| (Continued) | | |

OTHER PUBLICATIONS
Adobe Acrobat DC, "Convert existing forms to fillable PDFs," 2015, 12 pages.
(Continued)

*Primary Examiner* — Amelia L Tapp
(74) *Attorney, Agent, or Firm* — Perkins Coie LLP

(57) ABSTRACT

Technologies for simplifying visual organization of form information include a form simplification server. A virtual transaction form including editable input fields visually organized in an initial format is displayed. In response to a request for a simplified version of the virtual transaction form, the form simplification server generates a simplified virtual transaction form including editable input fields that correspond to the editable input fields of the virtual transaction form. The editable fields of the simplified virtual transaction form are visually organized in a format different from the initial format of the virtual transaction form. The simplified virtual transaction form is displayed. The form simplification server may also receive a user-specified data element input into one of the editable input fields of the virtual transaction form. The corresponding editable input field of the simplified virtual transaction form can be populated with the user-specified data element. Other embodiments are described and claimed.

22 Claims, 8 Drawing Sheets

(56) References Cited

U.S. PATENT DOCUMENTS

| | | |
|---|---|---|
| 5,032,989 A | 7/1991 | Tornetta |
| D321,903 S | 11/1991 | Chepaitis |
| 5,317,646 A | 5/1994 | Sang, Jr. et al. |
| 5,325,297 A | 6/1994 | Bird et al. |
| 5,361,201 A | 11/1994 | Jost |
| 5,392,388 A | 2/1995 | Gibson |
| 5,526,341 A | 6/1996 | Shiba et al. |
| 5,623,655 A | 4/1997 | Chisaka |
| 5,680,305 A | 10/1997 | Apgar |
| 5,754,850 A | 5/1998 | Janssen |
| D396,455 S | 7/1998 | Bier |
| 5,848,187 A | 12/1998 | Bricklin et al. |
| 5,943,679 A | 8/1999 | Niles et al. |
| 5,946,667 A | 8/1999 | Tull |
| 6,032,123 A | 2/2000 | Jameson |
| 6,067,831 A | 5/2000 | Amborn et al. |
| 6,289,460 B1 | 9/2001 | Hajmiragha |
| 6,401,070 B1 | 6/2002 | McManus |
| 6,519,618 B1 | 2/2003 | Snyder |
| D474,197 S | 5/2003 | Nguyen |
| D477,242 S | 7/2003 | Laats |
| 6,594,633 B1 | 7/2003 | Broeman |
| 6,609,109 B1 | 8/2003 | Bradley |
| 6,609,118 B1 | 8/2003 | Khedkar |
| 6,636,803 B1 | 10/2003 | Hartz |
| 6,651,217 B1 | 11/2003 | Kennedy et al. |
| 6,684,196 B1 | 1/2004 | Mini et al. |
| 6,711,554 B1 | 3/2004 | Salzmann et al. |
| 6,810,404 B1 | 10/2004 | Ferguson et al. |
| 6,898,317 B2 | 5/2005 | Struble et al. |
| 6,944,648 B2 | 9/2005 | Cochran et al. |
| D521,019 S | 5/2006 | Ording |
| 7,143,290 B1 | 11/2006 | Ginter et al. |
| D536,343 S | 2/2007 | Fong et al. |
| D544,495 S | 6/2007 | Evans et al. |
| 7,228,319 B1 | 6/2007 | Fuchs |
| D554,660 S | 11/2007 | Hoover et al. |
| D554,661 S | 11/2007 | Hoover et al. |
| 7,299,408 B1 | 11/2007 | Daconta et al. |
| 7,334,187 B1 * | 2/2008 | Stanciu ............... G06F 17/2247 715/222 |
| D566,722 S | 4/2008 | Jackson |
| 7,376,891 B2 | 5/2008 | Hitchcock et al. |
| D572,726 S | 7/2008 | Guimaraes et al. |
| 7,475,333 B2 | 1/2009 | Otter et al. |
| D591,305 S | 4/2009 | Shimoda |
| 7,543,228 B2 | 6/2009 | Kelkar et al. |
| D595,727 S | 7/2009 | Koes et al. |
| D599,284 S | 9/2009 | Misumi |
| D599,814 S | 9/2009 | Ogura et al. |
| D601,159 S | 9/2009 | Truelove et al. |
| 7,692,635 B2 | 4/2010 | Iwamura |
| 7,702,999 B1 | 4/2010 | Sperr et al. |
| D615,551 S | 5/2010 | Arnell |
| 7,725,359 B1 | 5/2010 | Katzfey et al. |
| D619,593 S | 7/2010 | Fujioka et al. |
| 7,765,125 B1 | 7/2010 | An |
| D624,557 S | 9/2010 | Allen et al. |
| 7,818,219 B2 | 10/2010 | Klivington et al. |
| 7,822,691 B1 | 10/2010 | Kuo |
| 7,917,842 B2 | 3/2011 | Garrison |
| 7,945,496 B2 | 5/2011 | Trott |
| 7,970,684 B1 | 6/2011 | Benda |
| 7,987,117 B2 | 7/2011 | Mozley |
| D643,047 S | 8/2011 | Guss et al. |
| D644,243 S | 8/2011 | Matas |
| D644,654 S | 9/2011 | Maitlen et al. |
| D650,790 S | 12/2011 | Jeans et al. |
| D650,807 S | 12/2011 | Impas et al. |
| D652,426 S | 1/2012 | Anzures |
| D654,925 S | 2/2012 | Nishizawa et al. |
| 8,145,909 B1 | 3/2012 | Agrawal et al. |
| D656,954 S | 4/2012 | Arnold et al. |
| 8,151,209 B2 | 4/2012 | Law et al. |
| D659,711 S | 5/2012 | Guss et al. |
| D660,317 S | 5/2012 | Jesberger |
| D664,205 S | 7/2012 | Xu et al. |
| D665,161 S | 8/2012 | Leifeld et al. |
| D665,162 S | 8/2012 | Leifeld et al. |
| D665,163 S | 8/2012 | Leifeld et al. |
| D665,421 S | 8/2012 | Morrow et al. |
| 8,239,496 B2 | 8/2012 | Peterson et al. |
| D667,429 S | 9/2012 | Wujcik et al. |
| D669,497 S | 10/2012 | Lee et al. |
| D669,499 S | 10/2012 | Gardner et al. |
| D671,558 S | 11/2012 | Anzures et al. |
| D676,060 S | 2/2013 | Frost et al. |
| D676,457 S | 2/2013 | Frost et al. |
| 8,375,016 B2 | 2/2013 | Allison et al. |
| D677,180 S | 3/2013 | Plitkins et al. |
| D682,305 S | 5/2013 | Mierau et al. |
| D682,882 S | 5/2013 | Cahill et al. |
| D683,757 S | 6/2013 | Phelan |
| D684,185 S | 6/2013 | van Dongen et al. |
| D684,990 S | 6/2013 | Walsh |
| D687,046 S | 7/2013 | Plitkins et al. |
| D687,057 S | 7/2013 | Plitkins |
| D687,460 S | 8/2013 | Tyler et al. |
| D687,851 S | 8/2013 | Sloo et al. |
| D689,505 S | 9/2013 | Convay et al. |
| D690,717 S | 10/2013 | Thomsen et al. |
| D690,718 S | 10/2013 | Thomsen et al. |
| D691,629 S | 10/2013 | Matas et al. |
| D692,444 S | 10/2013 | Lee et al. |
| 8,583,562 B1 | 11/2013 | McDaniel |
| 8,589,191 B1 | 11/2013 | Menzies |
| D696,265 S | 12/2013 | d'Amore et al. |
| D697,076 S | 1/2014 | Oda et al. |
| D697,518 S | 1/2014 | Thomsen et al. |
| D697,519 S | 1/2014 | Thomsen et al. |
| D697,935 S | 1/2014 | Lee et al. |
| D698,363 S | 1/2014 | Asai |
| D699,248 S | 2/2014 | Pearson et al. |
| D699,250 S | 2/2014 | Fujii et al. |
| D699,741 S | 2/2014 | Wantland et al. |
| D699,750 S | 2/2014 | Pearson et al. |
| D700,207 S | 2/2014 | Pearson et al. |
| 8,650,067 B1 | 2/2014 | Moss |
| 8,683,315 B2 | 3/2014 | Stover |
| D703,683 S | 4/2014 | Skidgel |
| D704,204 S | 5/2014 | Rydenhag |
| D705,263 S | 5/2014 | Hartley |
| D705,808 S | 5/2014 | Anzures et al. |
| D706,814 S | 6/2014 | Phelan |
| D707,705 S | 6/2014 | Folken |
| D708,203 S | 7/2014 | Johnson |
| D708,221 S | 7/2014 | Danton et al. |
| D708,226 S | 7/2014 | Takata et al. |
| D709,917 S | 7/2014 | Faulkner et al. |
| D711,421 S | 8/2014 | Bautista |
| D715,313 S | 10/2014 | Hontz, Jr. |
| D715,322 S | 10/2014 | Sakata |
| D716,325 S | 10/2014 | Brudnicki |
| D717,334 S | 11/2014 | Sakuma |
| D717,335 S | 11/2014 | Sakuma |
| D717,681 S | 11/2014 | Shail et al. |
| D717,822 S | 11/2014 | Brotman et al. |
| D717,823 S | 11/2014 | Brotman et al. |
| D718,325 S | 11/2014 | Schoger et al. |
| D721,090 S | 1/2015 | Hong et al. |
| D721,093 S | 1/2015 | Pereira |
| 9,330,375 B2 | 5/2016 | Allison et al. |
| 9,785,627 B2 | 10/2017 | Campanelli et al. |
| 1,006,211 A1 | 8/2018 | Tatang |
| 2001/0039506 A1 | 11/2001 | Robbins |
| 2002/0035520 A1 | 3/2002 | Weiss |
| 2002/0065739 A1 | 5/2002 | Florance |
| 2002/0069358 A1 | 6/2002 | Silvester |
| 2002/0082849 A1 | 6/2002 | Tenorio |
| 2002/0087389 A1 | 7/2002 | Sklarz |
| 2002/0099733 A1 | 7/2002 | Teruuchi et al. |
| 2002/0129656 A1 | 9/2002 | Tsuzuki |
| 2002/0135440 A1 | 9/2002 | Ryhanen |
| 2002/0184485 A1 | 12/2002 | Dray et al. |

(56) References Cited

U.S. PATENT DOCUMENTS

| | | |
|---|---|---|
| 2003/0046639 A1 | 3/2003 | Fai et al. |
| 2003/0056100 A1 | 3/2003 | Beatson |
| 2003/0101063 A1 | 5/2003 | Sexton |
| 2003/0121008 A1 | 6/2003 | Tischer |
| 2003/0191719 A1 | 10/2003 | Ginter et al. |
| 2003/0220807 A1 | 11/2003 | Hoffman et al. |
| 2003/0227482 A1* | 12/2003 | Bach .................. G06F 8/38 715/762 |
| 2003/0229552 A1 | 12/2003 | Lebaric |
| 2003/0236832 A1 | 12/2003 | McIntyre et al. |
| 2004/0098284 A1 | 5/2004 | Petito et al. |
| 2004/0128215 A1 | 7/2004 | Florance |
| 2004/0133493 A1 | 7/2004 | Ford et al. |
| 2004/0181749 A1 | 9/2004 | Chellapilla |
| 2004/0205534 A1 | 10/2004 | Koelle |
| 2004/0205653 A1 | 10/2004 | Hadfield et al. |
| 2004/0220885 A1 | 11/2004 | Salzmann et al. |
| 2004/0225884 A1 | 11/2004 | Lorenzini et al. |
| 2004/0255114 A1 | 12/2004 | Lee et al. |
| 2005/0086596 A1 | 4/2005 | Koch et al. |
| 2005/0108025 A1 | 5/2005 | Cagan |
| 2005/0177389 A1 | 8/2005 | Rakowicz et al. |
| 2005/0192930 A1 | 9/2005 | Hightower et al. |
| 2005/0251535 A1 | 11/2005 | Theissen et al. |
| 2005/0273417 A1 | 12/2005 | Budish |
| 2006/0007189 A1 | 1/2006 | Gaines |
| 2006/0015435 A1 | 1/2006 | Nathanson |
| 2006/0026032 A1 | 2/2006 | Higgins |
| 2006/0026136 A1 | 2/2006 | Drucker et al. |
| 2006/0069599 A1 | 3/2006 | Hatoun et al. |
| 2006/0085311 A1 | 4/2006 | Hoerle et al. |
| 2006/0116952 A1 | 6/2006 | Orfano |
| 2006/0149567 A1 | 7/2006 | Muller et al. |
| 2006/0190810 A1 | 8/2006 | Piersol |
| 2006/0200308 A1 | 9/2006 | Arutunian |
| 2006/0259440 A1 | 11/2006 | Leake et al. |
| 2007/0005383 A1 | 1/2007 | Kasower |
| 2007/0009158 A1 | 1/2007 | Geva et al. |
| 2007/0022141 A1 | 1/2007 | Singleton |
| 2007/0038533 A1 | 2/2007 | Huff |
| 2007/0088958 A1 | 4/2007 | Qa'Im-maqami |
| 2007/0118391 A1 | 5/2007 | Malaney et al. |
| 2007/0136361 A1 | 6/2007 | Lee et al. |
| 2007/0136679 A1 | 6/2007 | Yang |
| 2007/0168382 A1 | 7/2007 | Tillberg et al. |
| 2007/0179881 A1 | 8/2007 | Lord |
| 2007/0186157 A1 | 8/2007 | Walker |
| 2008/0091700 A1* | 4/2008 | Brotherson ........... G06F 17/248 |
| 2008/0091954 A1 | 4/2008 | Morris et al. |
| 2008/0097777 A1 | 4/2008 | Rielo |
| 2008/0133319 A1 | 6/2008 | Adiga |
| 2008/0154740 A1 | 6/2008 | Lee |
| 2008/0155391 A1 | 6/2008 | Sattler et al. |
| 2008/0167941 A1 | 7/2008 | Kagarlis |
| 2008/0209313 A1 | 8/2008 | Gonser |
| 2008/0260287 A1 | 10/2008 | Berryman et al. |
| 2008/0262833 A1 | 10/2008 | Kano et al. |
| 2008/0288312 A1 | 11/2008 | Miles |
| 2008/0301064 A1 | 12/2008 | Burns |
| 2008/0319890 A1 | 12/2008 | Urbanski |
| 2009/0003588 A1 | 1/2009 | Ross |
| 2009/0006241 A1 | 1/2009 | Zhao |
| 2009/0018975 A1 | 1/2009 | Geltner |
| 2009/0024912 A1 | 1/2009 | McCabe et al. |
| 2009/0025087 A1 | 1/2009 | Perison et al. |
| 2009/0029786 A1 | 1/2009 | Chen et al. |
| 2009/0043685 A1 | 2/2009 | Benjamin |
| 2009/0109455 A1* | 4/2009 | Smith .................. G06F 17/243 358/1.9 |
| 2009/0173552 A1 | 7/2009 | Elder et al. |
| 2009/0226090 A1 | 9/2009 | Okita |
| 2009/0320035 A1 | 12/2009 | Ahlgren |
| 2010/0011286 A1 | 1/2010 | Isoda |
| 2010/0023379 A1 | 1/2010 | Rappaport |
| 2010/0057538 A1 | 3/2010 | Hardman |
| 2010/0076903 A1 | 3/2010 | Klingenberg |
| 2010/0131331 A1 | 5/2010 | Ginsburg |
| 2010/0161460 A1 | 6/2010 | Vroom et al. |
| 2010/0161498 A1 | 6/2010 | Walker |
| 2010/0235727 A1 | 9/2010 | Ashton et al. |
| 2010/0287260 A1 | 11/2010 | Peterson et al. |
| 2011/0026828 A1 | 2/2011 | Balasubramanian et al. |
| 2011/0178905 A1 | 7/2011 | Kagarlis |
| 2011/0199631 A1 | 8/2011 | Healy |
| 2011/0258535 A1 | 10/2011 | Adler, III et al. |
| 2011/0270766 A1 | 11/2011 | Ramakrishnan et al. |
| 2011/0271173 A1 | 11/2011 | Ait-Mokhar et al. |
| 2011/0276395 A1 | 11/2011 | Gaton et al. |
| 2011/0276875 A1 | 11/2011 | McCabe et al. |
| 2011/0313945 A1 | 12/2011 | Callan |
| 2011/0314371 A1 | 12/2011 | Peterson et al. |
| 2012/0063684 A1 | 3/2012 | Denoue |
| 2012/0066061 A1 | 3/2012 | Clement |
| 2012/0096383 A1 | 4/2012 | Sakamoto et al. |
| 2012/0102002 A1 | 4/2012 | Sathyanarayana |
| 2012/0144285 A1 | 6/2012 | Bach et al. |
| 2012/0209875 A1 | 8/2012 | Hintze |
| 2012/0254045 A1 | 10/2012 | Orfano |
| 2012/0254156 A1 | 10/2012 | Rao |
| 2012/0297277 A1 | 11/2012 | King |
| 2012/0297301 A1 | 11/2012 | Mahoney et al. |
| 2013/0024788 A1* | 1/2013 | Olsen .................. G06Q 10/10 715/753 |
| 2013/0036347 A1 | 2/2013 | Eftekhari et al. |
| 2013/0086624 A1 | 4/2013 | Powell |
| 2013/0096819 A1 | 4/2013 | Tarnok |
| 2013/0097478 A1* | 4/2013 | Allison .................. G06Q 10/10 715/222 |
| 2013/0097480 A1 | 4/2013 | Allison et al. |
| 2013/0185753 A1 | 7/2013 | Kliot |
| 2013/0211945 A1 | 8/2013 | Po-Ching |
| 2013/0238965 A1 | 9/2013 | Barrus |
| 2013/0297442 A1 | 11/2013 | Simons |
| 2013/0317939 A1 | 11/2013 | Urbanski |
| 2013/0325623 A1 | 12/2013 | Balduf |
| 2013/0325665 A1 | 12/2013 | Shaffer |
| 2013/0346151 A1 | 12/2013 | Bleakley |
| 2014/0033088 A1* | 1/2014 | Shaver .................. G06F 17/212 715/764 |
| 2014/0164255 A1 | 6/2014 | Daly |
| 2014/0164260 A1 | 6/2014 | Spieckerman |
| 2014/0229543 A1 | 8/2014 | Allison et al. |
| 2014/0236751 A1 | 8/2014 | Bloomfield |
| 2015/0081497 A1 | 3/2015 | Patel |
| 2015/0242747 A1 | 8/2015 | Packes |
| 2015/0317701 A1 | 11/2015 | Thomas |
| 2015/0332371 A1 | 11/2015 | Lomas |
| 2016/0232629 A1 | 8/2016 | Allison et al. |
| 2017/0322681 A1 | 11/2017 | Allison |
| 2018/0225593 A1 | 8/2018 | Cozine |

FOREIGN PATENT DOCUMENTS

| | | |
|---|---|---|
| WO | WO-1996007156 A1 | 3/1996 |
| WO | 0106416 A2 | 1/2001 |
| WO | WO-2009012475 A1 | 1/2009 |
| WO | WO-2010105262 A1 | 9/2010 |
| WO | WO-2010151630 A2 | 12/2010 |
| WO | WO-2011056819 A1 | 5/2011 |
| WO | WO-2011139563 A2 | 11/2011 |

OTHER PUBLICATIONS

Adobe Acrobat XI, "Convert an existing form into a fillable PDF form with Adobe Acrobat XI," Quick Start Guide, 2012, 1 page.

Nuance, Power PDF How to: Create Fillable PDF Form, "How to get started, and get more out of your PDF's," 4 pages, Retrieved on Oct. 12, 2016.

U.S. Appl. No. 14/243,128, filed Apr. 2, 2014, Allison et al.

U.S. Appl. No. 14/620,262, filed Feb. 12, 2015, Allison et al.

U.S. Appl. No. 15/135,198, filed Apr. 21, 2016, Allison.

(56) References Cited

OTHER PUBLICATIONS

International Search Report dated Feb. 22, 2010 for Application No. PCT/US2009/061012.
International Search Report, PCT/US2010/039768, dated Feb. 23, 2011, 4 pages.
International Search Report, PCT/US2011/033194, dated Nov. 28, 2011, 4 pages.
International Search Report, PCT/US2011/040218, dated Feb. 17, 2012, 3 pages.
International Search Report; PCT/US2012/046386; dated Oct. 5, 2012; 2 pages.
Written Opinion of the International Searching Authority, PCT/US2008/070566, dated Feb. 19, 2009, 4 pages.
Written Opinion of the International Searching Authority; PCT/US2012/046386; dated Oct. 5, 2012; 7 pages.
Non-Final Office Action for U.S. Appl. No. 14/620,262; dated Dec. 31, 2018; 18 pages.
Non-Final Office Action for U.S. Appl. No. 15/436,617; dated Mar. 13, 2019; 20 pages.
FH FA, "House Price Index Frequently Asked Questions," Federal Housing Finance Agency, Aug. 2018, available at https://www.fhfa.gov/Media/PublicAffairs/Pages/House-Price-Index-Frequently-Asked-Questions.aspx (accessed Oct. 29, 2018). (Year: 2018), 9 pages.
Final Office Action for U.S. Appl. No. 14/177,656; dated Oct. 18, 2018; 30 pages.
Final Office Action for U.S. Appl. No. 14/177,656; dated Dec. 28, 2017; 25 pages.
Final Office Action for U.S. Appl. No. 14/620,262; dated Jun. 20, 2018; 18 pages.
Kiplinger Personal Finance, "Before Submitting a Home Offer, Make Sure All Bases Are Covered," Jan. 2015, available at https://www.kiplinger.com/article/real-estate/T029-COOO-SOO 1-6-ways-to-stage-your-home-for-less-than-1-000 .html (access Oct. 28, 2018), 8 pages.
Non-Final Office Action for U.S. Appl. No. 13/547,120; dated Nov. 1, 2017; 14 pages.
Non-Final Office Action for U.S. Appl. No. 14/177,656; dated Apr. 4, 2018; 28 pages.
Non-Final Office Action for U.S. Appl. No. 14/620,262; dated Dec. 7, 2017; 18 pages.
Non-Final Office Action for U.S. Appl. No. 15/131,747; dated Sep. 7, 2018; 38 pages.
Non-Final Office Action for U.S. Appl. No. 15/131,747; dated Feb. 5, 2018; 38 pages.
Non-Final Office Action for U.S. Appl. No. 15/135,398; dated Nov. 7, 2018; 99 pages.
Notice of Allowance for U.S. Appl. No. 13/547,120; dated Jun. 28, 2018; 10 pages.
U.S. Appl. No. 16/135,282 for Allison, filed Sep. 19, 2018.
Non-Final Office Action for U.S. Appl. No. 15/436,617; dated Nov. 28, 2018; 16 pages.
Non-Final Office Action for U.S. Appl. No. 14/177,656; dated Apr. 19, 2019; 31 pages.
Final Office Action for U.S. Appl. No. 15/135,398; dated Jun. 10, 2019; 99 pages.
Final Office Action for U.S. Appl. No. 15/131,747; dated Jun. 14, 2019; 14 pages.
Final Office Action for U.S. Appl. No. 15/436,617; dated Jul. 3, 2019; 21 pages.
Non-Final Office Action for U.S. Appl. No. 16/135,282; dated Aug. 22, 2019; 14 pages.
Non-Final Office Action for U.S. Appl. No. 15/135,398; dated Dec. 26, 2019; 90 pages.
Notice of Allowance for U.S. Appl. No. 14/620,262; dated Sep. 23, 2019; 12 pages.
Corrected Notice of Allowance for U.S. Appl. No. 14/620,262; dated Dec. 23, 2019; 12 pages.
Non-Final Office Action for U.S. Appl. No. 15/436,617; dated Oct. 23, 2019; 24 pages.
Final Office Action for U.S. Appl. No. 16/135,282; dated Feb. 6, 2020; 15 pages.
Non-Final Office Action for U.S. Appl. No. 15/131,747; dated Jan. 9, 2020; 37 pages.
Final Office Action for U.S. Appl. No. 15/436,617; dated Feb. 27, 2020; 34 pages.
Notice of Allowance for U.S. Appl. No. 14/177,656; dated Apr. 17, 2020; 9 pages.

\* cited by examiner

100

Contract for Residential Sale and Purchase

102

1\*    1. Sale and Purchase: _____ ("Seller")

2\*    and _____ ("Buyer")

3     (the "parties") agree to sell and buy on the terms and conditions specified below the property described as:

4\*    Street Address: _____

5\*    City: _____ Zip Code: _____ County: _____

6\*    Legal Description: _____

7\*    _____ Tax ID No.: _____

8     together with all existing improvements and attached items, including fixtures; built-in furnishings; major appliances (including 9\*    but not limited to range(s), refrigerator(s), dishwasher(s), washer(s), and dryer(s)): _____ (#) ceiling fans (all ceiling fans if left 10    blank); light fixtures; attached wall-to-wall carpeting; and rods, draperies, and other window treatments as of date of Buyer's 11\*    initial offer. The only other items included in the purchase are: _____

12    _____

13    _____

14\*    The following attached items are excluded from the purchase: _____

15\*    _____

16    The real and personal property described above as included in the purchase is referred to as the "Property." Personal 17    property listed in this Contract is included in the purchase price, has no contributory value, and is being left for 18    Seller's convenience.

19\*    2. Purchase Price: $ _____ payable by Buyer in U.S. currency as follows:

20    All deposits will be made payable to "Escrow Agent" named below and held in escrow by:

21\*    Escrow Agent's Name: _____

22\*    Escrow Agent's Address: _____

23\*    Escrow Agent's Phone: _____

| HEADER AND CONTROL BAR |
|---|

CONTRACT FOR RESIDENTIAL SALE AND PURCHASE — 202

PEOPLE   206   204

| BUYER 1 | BUYER 2 | HOME WARRANTY |
|---|---|---|
| BETTY BUYER<br>BETTY@BUYER.COM<br>1 BETTY HOME WAY,<br>SAN FRANCISCO, CA | [ADD BUYER 2] | [ADD] |
| [MORE] | | |

| SELLER 1 | SELLER 2 | TITLE AGENT |
|---|---|---|
| [ADD SELLER 1] | [ADD SELLER 2] | [ADD AGENT] |

| SELLER'S AGENT | | ESCROW AGENT |
|---|---|---|
| [ADD AGENT] | | [ADD AGENT] |

PROPERTY INFORMATION

| MLS# | CITY | COUNTY |
|---|---|---|
| [ADD MLS NUMBER] | SMALLVILLE | [ADD COUNTY] |
| STREET 1 | STREET 2 | ZIP CODE |
| [ADD APT#/SUITE#] | 11235 MAIN STREET | 81321 |

FIG. 2

SIMPLIFIED FORM INTERFACE SYSTEM AND METHOD

CROSS REFERENCE TO RELATED APPLICATION

This application claims the benefit of U.S. Provisional Patent Application Ser. No. 62/044,514, filed on Sep. 2, 2014, entitled, SIMPLIFIED FORM INTERFACE SYSTEM AND METHOD, the disclosure of which is hereby incorporated by reference in its entirety.

TECHNICAL FIELD

Embodiments of the technology relate, in general, to systems and methods for simplifying entry of form information, and in particular to systems and methods related to simplified interfaces for entering form information for form-based business transactions.

BACKGROUND

Business transactions between parties are increasingly being conducted online through the exchange of electronic forms and documents. For example, in the context of a real estate transaction, various different forms may be exchanged between a buyer, a seller, a real estate agent, and an escrow agent during the transaction. Such forms typically include numerous data fields and complex language, any of which may be difficult for a party to the transaction to understand. Additionally, some forms have complex visual layouts. Such layouts may make it difficult for a party to the transaction to interact with a particular form on certain electronic devices such as, for example, mobile computing devices.

SUMMARY

In an embodiment, the present disclosure is directed, in part, to a method for simplifying visual organization of form information. The method includes displaying, by a form simplification server, a virtual transaction form that includes a first editable input field and a second editable input field visually organized in a first format. The method also includes receiving, by the form simplification server and from a remote computing device, a request to view a simplified version of the virtual transaction form. Additionally, the method includes generating, by the form simplification server and in response to receiving the request, a simplified virtual transaction form. The simplified virtual transaction form includes a third editable input field corresponding to the first editable field of the virtual transaction form and a fourth editable input field corresponding to the second editable field of the virtual transaction form. The third editable field and the fourth editable field of the simplified virtual transaction form are visually organized in a second format different from the first format. The method further includes displaying, by the form simplification server, the simplified virtual transaction form.

In some embodiments of the method, the virtual transaction form is an electronic representation of a corresponding physical transaction form and is visually similar to the physical transaction form. Additionally or alternatively, the virtual transaction form includes a virtual real estate transaction form. In some embodiments of the method, the file format of the virtual transaction form is one of a portable document format and a word processor document format.

In some embodiments of the method, generating the simplified virtual transaction form includes determining, by the form simplification server, whether a first user-specified data element corresponding to the first editable input field is stored in a data store. In such embodiments, the method includes retrieving, by the form simplification server, the first user-specified data element in response to a determination that the first user-specified data element corresponding to the first editable input field is stored in the data store. The method also includes populating, by the form simplification server, the third editable input field of the simplified virtual transaction form with the retrieved first user-specified data element.

In some embodiments, the method further includes receiving, by the form simplification server and from the remote computing device, a first user-specified data element input into the first editable input field of the virtual transaction form. In such embodiments, the method further includes storing, by the form simplification server, the received first user-specified data element in a record of a data store that corresponds to the first editable input field of the virtual transaction form. Additionally, the method of such embodiments includes populating, by the form simplification server and subsequent to receiving the request, the third editable input field of the simplified virtual transaction form with the received and stored first user-specified data element.

Additionally, in some embodiments, the method further includes receiving, by the form simplification server and from the remote computing device, a first user-specified data element input into the third editable input field of the simplified virtual transaction form. In such embodiments, the method further includes storing, by the form simplification server, the received first user-specified data element in a record of a data store that corresponds to the third editable input field of the simplified virtual transaction form. Additionally, the method of such embodiments includes receiving, by the form simplification server and from the remote computing device, a request to view the virtual transaction form and populating, by the form simplification server, the first editable input field of the virtual transaction form with the received and stored first user-specified data element. The method of such embodiments may further include applying, by the form simplification server, a rule to the received first user-specified data element. In such embodiments, the rule specifies population and storage conditions for received user-specified data element. Additionally, in such embodiments, storing the received first user-specified data element in the record of the data store and populating the first editable input field of the virtual transaction form includes storing the received first user-specified data element in the record of the data store and populating the first editable input field of the virtual transaction form based on application of the rule to the received first user-specified data element.

In some embodiments, the method further includes receiving, by the form simplification server and from the remote computing device, a first user-specified data element input into the third editable input field of the simplified virtual transaction form. In such embodiments, the method further includes determining, by the form simplification server, whether a second user-specified data element corresponding to the first editable input field of the virtual transaction form is stored in a data store. The method of such embodiments may include storing, by the form simplification server and in response to determining that a second user-specified data element corresponding to the first editable input field of the virtual transaction form is not stored in the data store, the received first user-specified data element in a record of a data store that corresponds to the third editable input field of the simplified virtual transaction form. populating, by the form simplification server, the first editable input field of the virtual transaction form with the received and stored first user-specified data element. Additionally, in such embodiments, the third editable field and the fourth editable field of the simplified virtual transaction form are visually organized based on relevance.

Additionally, in some embodiments, the method further includes determining, by the form simplification server, the second format with which to visually organize the third and fourth editable fields of the simplified virtual transaction form based on at least one of a characteristic of the remote computing device or a characteristic of a communication medium across which the remote computing device and the form simplification server communicate.

In another embodiment, the present disclosure is directed, in part, to a system for simplifying visual organization of form information. The system includes a form simplification server having a processor executing instructions stored in memory. The instructions cause the processor to display a virtual transaction form that includes a first editable input field and a second editable input field visually organized in a first format. The instructions further cause the processor to receive, from a remote computing device, a request to view a simplified version of the virtual transaction form. Additionally, the instructions further cause the processor to generate, in response to receipt of the request, a simplified virtual transaction form. The simplified virtual transaction form includes a third editable input field that corresponds to the first editable field of the virtual transaction form and a fourth editable input field that corresponds to the second editable field of the virtual transaction form. Additionally, the third editable field and the fourth editable field of the simplified virtual transaction form are visually organized in a second format different from the first format. The instructions also cause the processor to display the simplified virtual transaction form.

In some embodiments of the system, the instructions that cause the processor of the form simplification server to generate the simplified virtual transaction form include instructions to determine whether a first user-specified data element that corresponds to the first editable input field is stored in a data store. In such embodiments, the instructions further cause the processor to retrieve the first user-specified data element in response to a determination that the first user-specified data element corresponds to the first editable input field is stored in the data store. Additionally, in such embodiments, the instructions further cause the processor to populate the third editable input field of the simplified virtual transaction form with the retrieved first user-specified data element.

In some embodiments of the system, the instructions further cause the processor of the form simplification server to receive, from the remote computing device, a first user-specified data element input into the first editable input field of the virtual transaction form and store the received first user-specified data element in a record of a data store that corresponds to the first editable input field of the virtual transaction form. Additionally, in such embodiments, the instructions further cause the processor to populate, subsequent to receiving the request, the third editable input field of the simplified virtual transaction form with the received and stored first user-specified data element.

In yet another embodiment, the present disclosure is directed, in part, to a method for simplifying visual organization of form information. The method includes displaying, by a form simplification server, a virtual transaction form that includes a first editable input field, a first description element visually associated with the first editable input field, a second editable input field, and a second description element visually associated with the second editable input field. The first editable input field, the first description element, the second editable input field, and the second description element are visually organized in a first format. The method further includes receiving, by the form simplification server and from a remote computing device, a request to view a simplified version of the virtual transaction form. The method also includes generating, by the form simplification server and in response to receiving the request, a simplified virtual transaction form. The simplified virtual transaction form includes a third editable input field corresponding to the first editable field of the virtual transaction form and a fourth editable input field corresponding to the second editable field of the virtual transaction form. Additionally, the third editable field and the fourth editable field of the simplified virtual transaction form are visually organized in a second format different from the first format that excludes the first and second description elements. The method also includes displaying, by the form simplification server, the simplified virtual transaction form.

In some embodiments of the method, generating the simplified virtual transaction form includes determining, by the form simplification server, whether a first user-specified data element corresponding to the first editable input field is stored in a data store. In such embodiments, the method includes retrieving, by the form simplification server, the first user-specified data element in response to a determination that the first user-specified data element corresponding to the first editable input field is stored in the data store. The method also includes populating, by the form simplification server, the third editable input field of the simplified virtual transaction form with the retrieved first user-specified data element.

In some embodiments, the method further includes receiving, by the form simplification server and from the remote computing device, a first user-specified data element input into the first editable input field of the virtual transaction form. In such embodiments, the method further includes storing, by the form simplification server, the received first user-specified data element in a record of a data store that corresponds to the first editable input field of the virtual transaction form. Additionally, the method of such embodiments includes populating, by the form simplification server and subsequent to receiving the request, the third editable input field of the simplified virtual transaction form with the received and stored first user-specified data element.

Additionally, in some embodiments, the method further includes receiving, by the form simplification server and from the remote computing device, a first user-specified data element input into the third editable input field of the simplified virtual transaction form. In such embodiments, the method further includes storing, by the form simplification server, the received first user-specified data element in a record of a data store that corresponds to the third editable input field of the simplified virtual transaction form. Additionally, the method of such embodiments includes receiving, by the form simplification server and from the remote computing device, a request to view the virtual transaction form and populating, by the form simplification server, the first editable input field of the virtual transaction form with the received and stored first user-specified data element.

The method of such embodiments may further include applying, by the form simplification server, a rule to the received first user-specified data element. In such embodiments, the rule specifies population and storage conditions for received user-specified data element. Additionally, in such embodiments, storing the received first user-specified data element in the record of the data store and populating the first editable input field of the virtual transaction form includes storing the received first user-specified data element in the record of the data store and populating the first editable input field of the virtual transaction form based on application of the rule to the received first user-specified data element.

Additionally, in some embodiments, the method further includes determining, by the form simplification server, the second format with which to visually organize the third and fourth editable fields of the simplified virtual transaction form based on at least one of a characteristic of the remote computing device or a characteristic of a communication medium across which the remote computing device and the form simplification server communicate.

BRIEF DESCRIPTION OF THE DRAWINGS

The present disclosure will be more readily understood from a detailed description of some example embodiments taken in conjunction with the following figures:

FIG. 1 depicts an example business transaction form, according to one embodiment;

FIG. 2 depicts an example simplified form interface for entry of information into a business transaction form, according to one embodiment;

DETAILED DESCRIPTION

Figure 3:
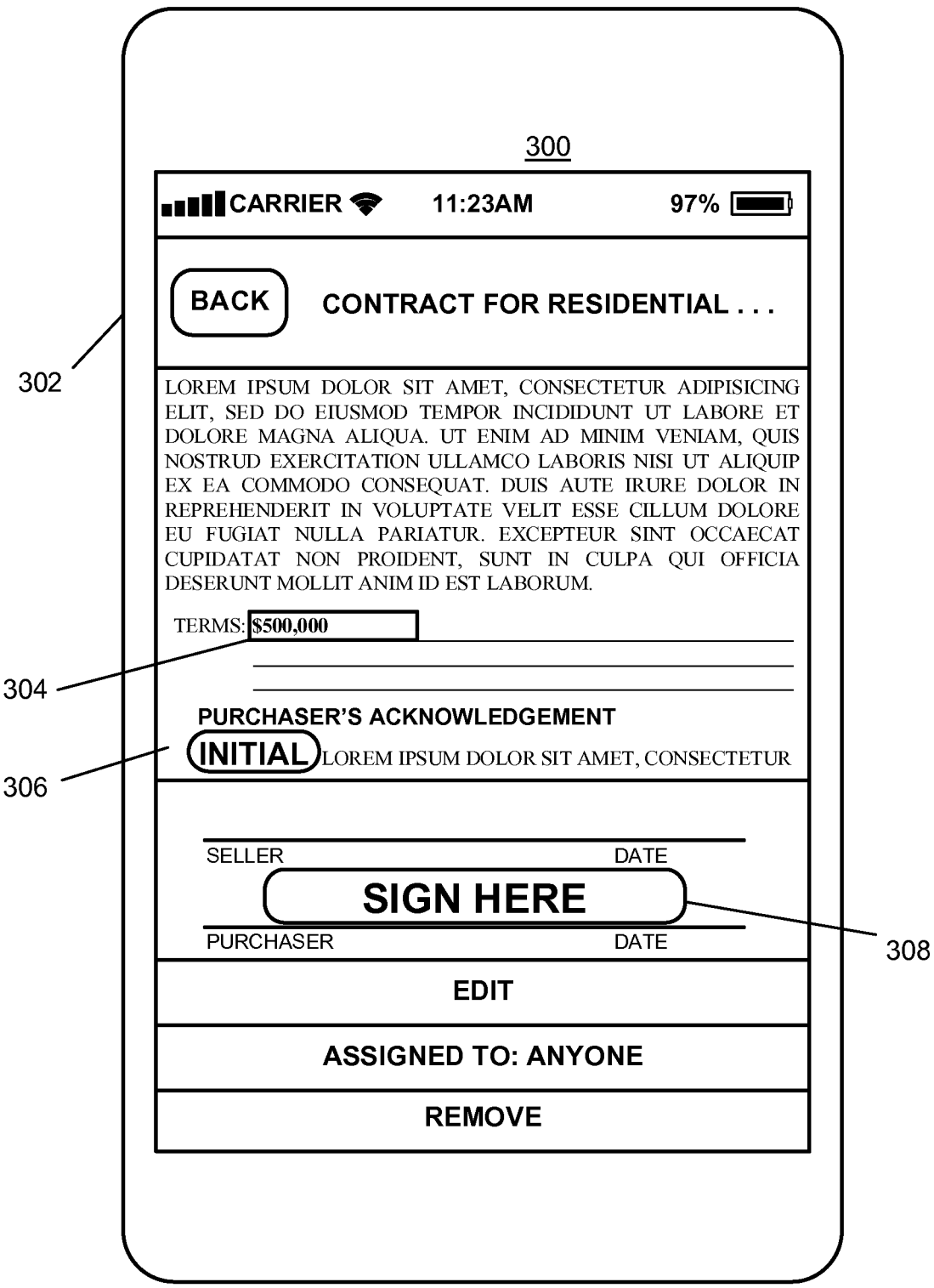
FIG. 3 depicts an example form displayed on a mobile computing platform, according to one embodiment.

Various non-limiting embodiments of the present disclosure will now be described to provide an overall understanding of the principles of the structure, function, and use of simplified form interface systems and methods disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Described herein are example embodiments of simplified form interfaces for form-based business transactions. Although the examples described systems and methods for providing simplified form interfaces, the systems and methods described herein can be used for other suitable types of business transactions as well. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Referring to FIG. 1, a portion of an example business transaction form 100 is presented. The form 100 illustrated in FIG. 1 is a contract for residential sale and purchase. The form 100 could be any suitable form, for example a disclosure form used in real estate transactions such as a lead-based paint disclosure form. The form 100 includes fields 102 that are filled out by parties to the contract, for example buyers, sellers, and agents such as escrow agents. The fields 102 can be text fields, check boxes, initial boxes, signature boxes, among other types of fields 102. The forms 100 can be pre-printed paper forms, or can be forms in electronic format. Example electronic formats include Adobe Portable Document Format (PDF), Microsoft Word, Rich Text Format (RTF), or any other suitable electronic format as would be understood in the art. Forms 100 in electronic format can be printed and information entered by hand by parties. Some forms permit information to be entered directly into the form using, for example, a computing device or computer. For a typical business transaction, there may be multiple ways of entering information into the various forms 100 needed to formalize the transaction, including editing text in a Word™ document, filling in a field of a PDF form, and signing a printed form.

In some embodiments, the form 100 and the data entered into the fields 102 of the form 100 can be stored separately, for example in different layers of an electronic document, or in separate data structures when using an electronic workflow system. Example electronic workflow systems are presented in U.S. application Ser. No. 13/547,120 filed Jul. 12, 2012 and titled Systems, Methods and Apparatus for Form Building, in U.S. application Ser. No. 13/547,118 filed Jul. 12, 2012 and titled Systems, Methods and Apparatus for Form Building, and in PCT Application Serial No. PCT/

US12/46386, filed Jul. 12, 2012 and titled Systems, Methods and Apparatus for Form Building, each of which is herein incorporated by reference in its entirety. An electronic workflow system can store the underlying form 100 separately from the data that is entered into the fields 102 of the form, and combine the fields 102 and data with the form 100 when appropriate, for example when printing out a contract onto paper.

The form 100 and data entered into the fields 102 can be stored in a suitable data store, for example as records in a database. In a configuration, the data can be stored in a file, a suitable data structure, or as metadata associated with the form 100. The database can execute on a remote server, such as a cloud-based server that is accessed over a network, such as the Internet, using a suitable communication channel and protocol, such as TCP/IP over a wired or wireless data link. The database, electronic workflow system, and other computer processes can be comprised of software modules that execute on one or more suitable computing platforms, for example PC, Mac or Linux based computers, such as a desktop computers, laptops, tablets, servers, or similar computing devices. The operations performed by each software module and the database can be performed by a common server or servers, or executed across multiple servers as would be understood in the art. In embodiments, the software modules and database can include third-party software. The software modules can communicate over networks, such as the Internet or intranets, using any suitable communication channels and protocols including data links for wired network connections, wireless WiFi/802.11x connections, and mobile wireless communications.

Each software module can include software or other computer instructions executing on suitable computing hardware, such as a dedicated server, a personal computer, a server, multiple computers, a collection of networked computers, a cloud-based computer system, a web-based computer system, or from a storage device, as would be appropriate for the particular type of system. Each computing device can include one or multiple processing units, such as central processing units and/or graphics processing units, may perform instructions stored in memory to execute the processes described herein.

Referring now also to FIG. 2, an example simplified form interface 200 for entry of information into a business transaction form 100 is presented. The simplified form interface 200 can be a view of the form 100 of FIG. 1 where the fields 102 are organized or presented in a more user friendly or simplified manner. The simplified form interface can include a header and control bar 202 which, in addition to providing information, can include selection buttons for saving, returning to other screens, obtaining help, and setting configurable options, as would be understood in the art. One such control button can allow the user to toggle between the view of the fields 206 presented with the simplified form interface 200 of FIG. 2, and the view of the fields 102 presented with the form 100 of FIG. 1. In a configuration, that view toggle control button can be placed in the same position of a user interface, allowing a user to switch back and forth between the simplified form interface 200 of FIG. 2 and the form 100 of FIG. 1.

The simplified form interface 200 can include labels 204 that describe the various portions of the simplified form interface 200. The labels 204 can correspond to fields 102 in the form of FIG. 1. The labels 204 can identify data entry fields 206. The data entry fields 206 can correspond to the data entered into the fields 102 of the form of FIG. 1 in various ways. In a first configuration, there can be a one-to-one correspondence of a data entry field 206 of FIG. 2 to a field 102 of FIG. 1. For example, a buyer's identify such as name and address can be entered into a data entry field 206, and that buyer's identity can have a one-to-one correspondence to a field 102 in FIG. 1 that identifies the buyer in a real estate contract form. In a second configuration, there can be a many-to-one correspondence of multiple data entry fields 206 of FIG. 2 to a single field of FIG. 1. For example, the identities of multiple buyers can be separately entered into different data entry fields 206 as shown in FIG. 2. Those multiple data entry fields 206 can correspond to a single buyer field 102 in FIG. 1. In a third configuration, there can be a one-to-many correspondence of a data entry field 206 of FIG. 2 to multiple fields 102 of FIG. 1. For example, a data entry field 206 for a seller to initial as acceptance of terms of a contract can be duplicated to multiple initial fields 102 for the seller in FIG. 1. In a configuration, there can be no correspondence between a data entry field 206 of FIG. 2 and a field 102 of FIG. 1. For example, a radio button used as a data entry field 206 can include multiple selections, and based upon a radio button selection by the user, only one field 102 and not other fields 102 of FIG. 1 may be correspondingly selected. Various combinations and configurations can be used to correlate data entered into a data entry field 206 of FIG. 2 with data entered into a field of FIG. 1.

Rules can be configured to control how data entered into a field 102 or data entry field 206 is populated into another field 102 or data entry field 206. The type of form 100 and available fields 102 of FIG. 1 can determine what data entry fields 206 are presented in the simplified form interface 200 and what data entered into those data entry fields 206 can populate a field 102 in the form 100 of FIG. 1. In an embodiment, data can be entered into either the data entry field 206 of FIG. 2 or a corresponding field 102 of FIG. 1, and then be automatically populated into the other form 102 or simplified form interface 200. In a configuration, rules can be set to check corresponding fields for existing data before automatically populating corresponding entries. In a configuration, a user may be presented with a confirmation box if a data entry would change data in a corresponding field 102 or data entry field 206. In a configuration, a field 102 or data entry field 206 can be locked to prevent inadvertent or purposeful changes. In a configuration, a field 102 or data entry field 206 can include track changes type functionality to visually show when a field 102 or data entry field 206 has been modified. The track changes type functionality can include visible and/or hidden metadata such as an indication of the date and time of the change, and the identity of the user who changed that data.

Referring now also to FIG. 3, an example screen 300 of an electronic workflow system executing on a mobile computing device 302 is presented. The screen 300 can include fields 304 that a user wants to edit. For example, a buyer may desire to counter-offer with a different offering price for a property than the amount offered by a seller. The screen 300 can include a field 306 that was changed by another party and which requires the user's approval. For example, a seller may desire to exclude certain items associated with a property, such a children's swing set or a doghouse, from the sale of the property, and the buyer may be required to initial the buyer's approval of those excluded items. The screen 300 can include a contract acceptance selection 308. In a configuration, the contract acceptance selection 308 can include a confirmation screen (not shown) to ensure the party intended to accept the contract.

Figure 4:
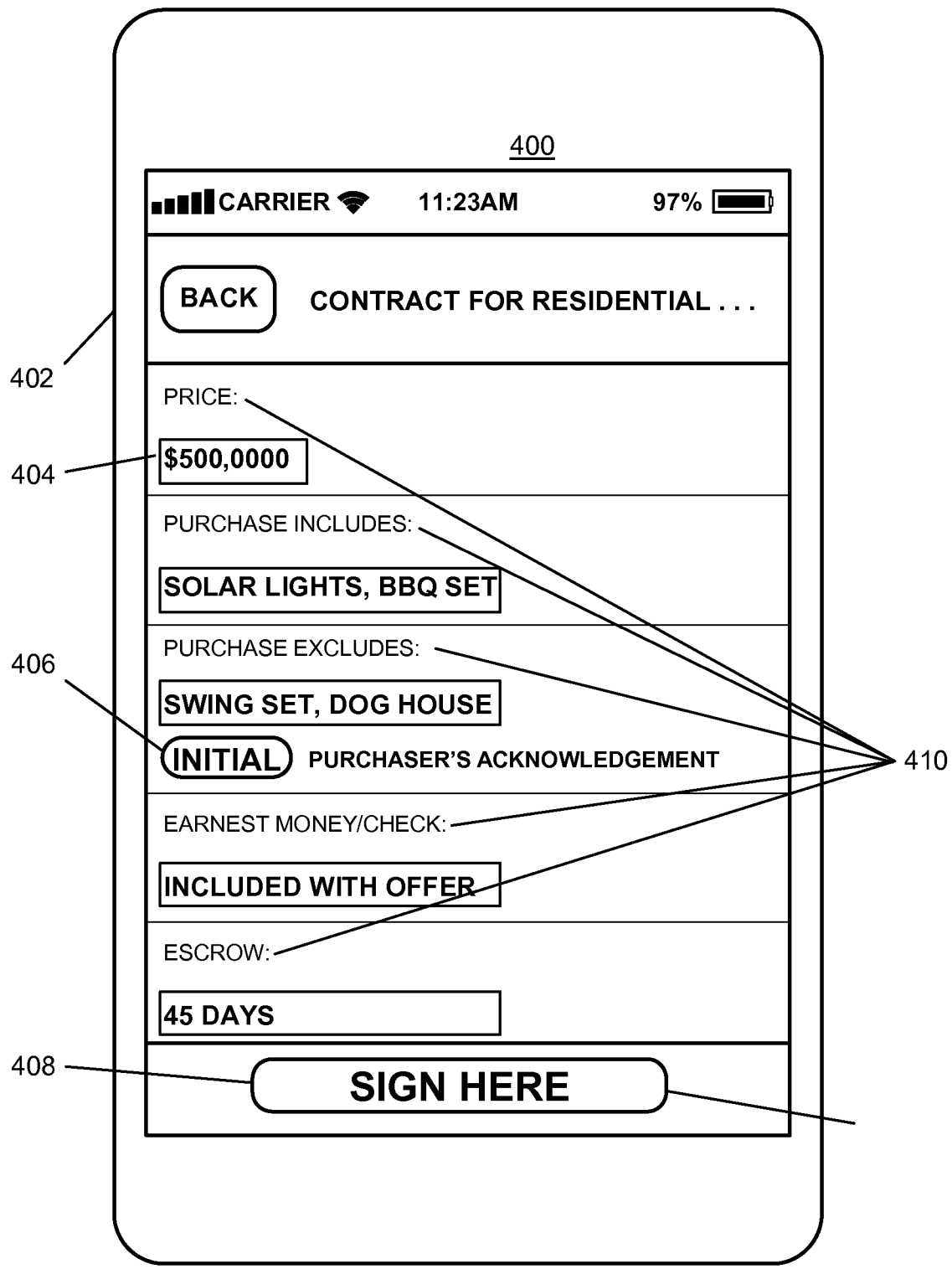
FIG. 4 depicts an example simplified form interface on a mobile computing platform, according to one embodiment.

Referring now also to FIG. 4, an example screen 400 of a simplified form interface on a mobile computing platform 402 is presented. The screen 400 can include simplified data entry fields 404, 406 that correspond to fields 304, 306 in FIG. 3. For example, a user can edit the first data entry field 404, while the second data entry field 406 can require an acceptance of the terms present in the second data entry field 406 by the user. Similar to FIG. 3, the screen of FIG. 4 can include a contract acceptance selection 408 and require confirmation of the user and/or authentication by user. Labels 410 can provide identifying indicia to assist the user. The simplified form interface presented on the screen 400 beneficially presents information to the user in a more user friendly manner.

In FIG. 3, the screen 300 that is presented can require the user to view the form to ascertain what particular fields 304, 306 represent in the form. One method to assist the user is to provide an identifying label near the field, for example a pop up box that identifies the field. In FIG. 4 however, the screen 400 of the simplified form interface can beneficially use labels 410 to more easily identify data entry fields 404, 406 for the user. Further, the screen 400 of the simplified form interface can beneficially organize the data entry fields 404, 406 in a more intuitive manner for the user, for example by grouping data entry fields 404, 406 based on relevance. For example, in the screen 400 of the simplified form interface, a data entry field for excluded items in a contract can be placed directly next to, or below, a data entry field for included items in the contract. While in the screen 300 of FIG. 3, those corresponding fields may be in different places of the contract.

Figure 5:
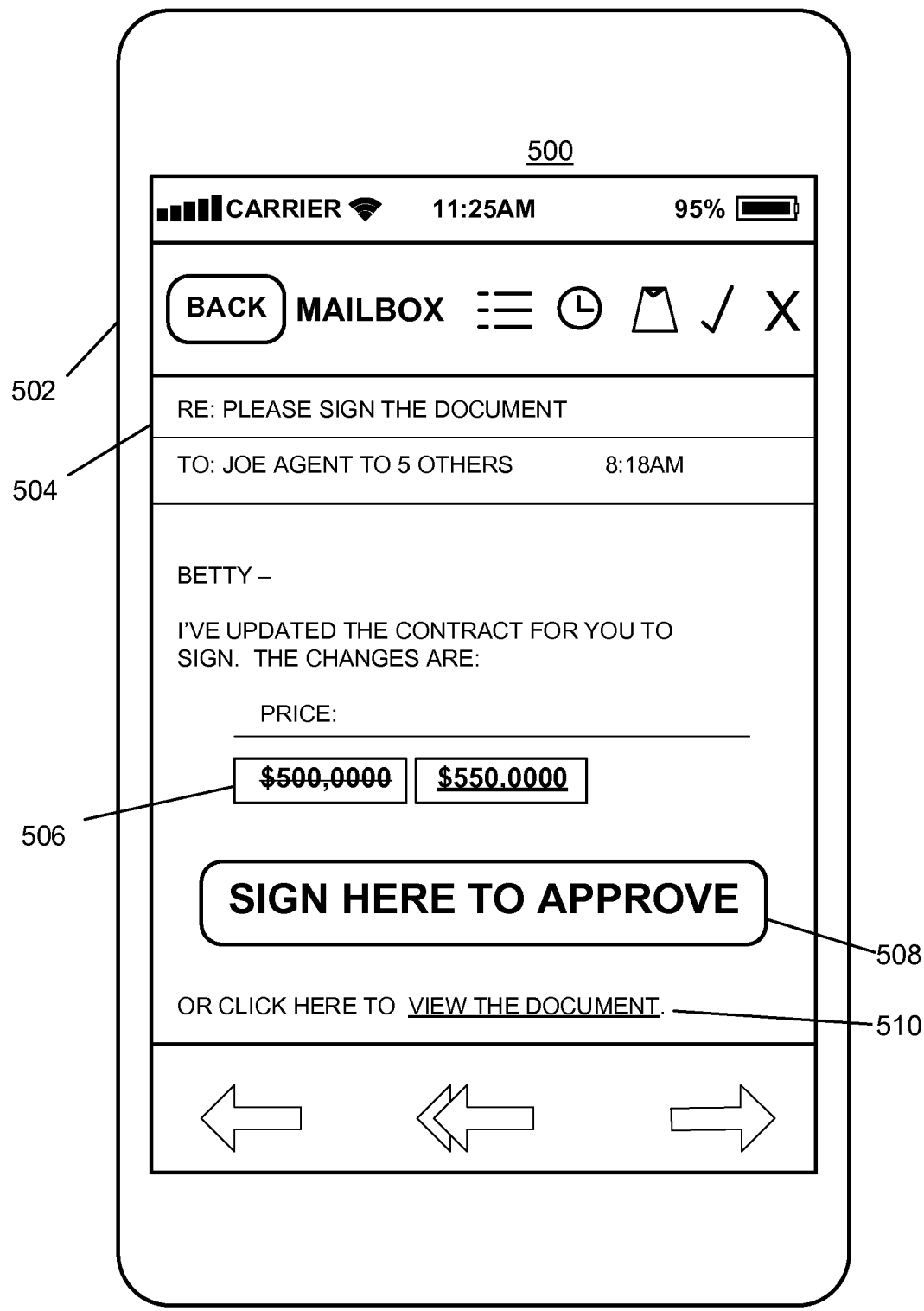
FIG. 5 depicts an example simplified communication for a form-based transaction, according to one embodiment.

Referring now also to FIG. 5, a screen 500 on a mobile computing platform 502 illustrates another embodiment of a simplified form interface. The screen 500 shows an email 504 sent to a party to the contract. The email 504 can include information 506 about a data entry field associated with the form. For example, as illustrated in FIG. 5, the information 506 included in the email can indicate a change in the offer price of the property from the seller. The user can click on an acceptance button 508 to accept the offer. The simplified form interface can use any suitable means for sending the acceptance. For example, in various embodiments the acceptance button 508 can be a hyperlink, cause a script to execute, use tools available on the mail system similar to voting button functionality, send a reply containing a confirmation code, or any other suitable means either in existence or yet to be developed. In a configuration, the user can further edit the information 506 and send a reply email to make a counter offer. In a configuration, the email can include a link 510, such as a hyperlink, that enables the user to access the form directly, for example by causing the execution of a dedicated app on the mobile device 502 as described above or by opening a suitable browser window to an electronic workflow system to view the form.

The simplified form interface advantageously enables the data from forms to be presented to users in different formats. A format can be selected based upon the computing device and communication medium available to the user. For example, detailed web pages can be easily viewed on high resolution monitors available on laptops and desktops, while laptops and tablets are generally wirelessly connected and may benefit from using less bandwidth intensive screens. Mobile computing devices such as smartphones, iPhones™, and iPads™ can use dedicated apps instead of using web pages. Dedicated apps can be easier to start and execute for users than web pages. However, the simplified form interface advantageously allows users to communicate forms and form data using ubiquitous, and generic, communication methods. For example, as illustrate in FIG. 5, a user can receive form data and provide confirmation or counter offers using email. Email is generally available to all types of users and can be used on different computing platforms, using different types of operating systems, and different types of communication networks. In various configurations, different types of social media can be used, whether in existence today, or yet to be developed, as would be understood by one of ordinary skill in the art. For example, in different embodiments, messaging programs and social media websites can be used.

Figure 6:
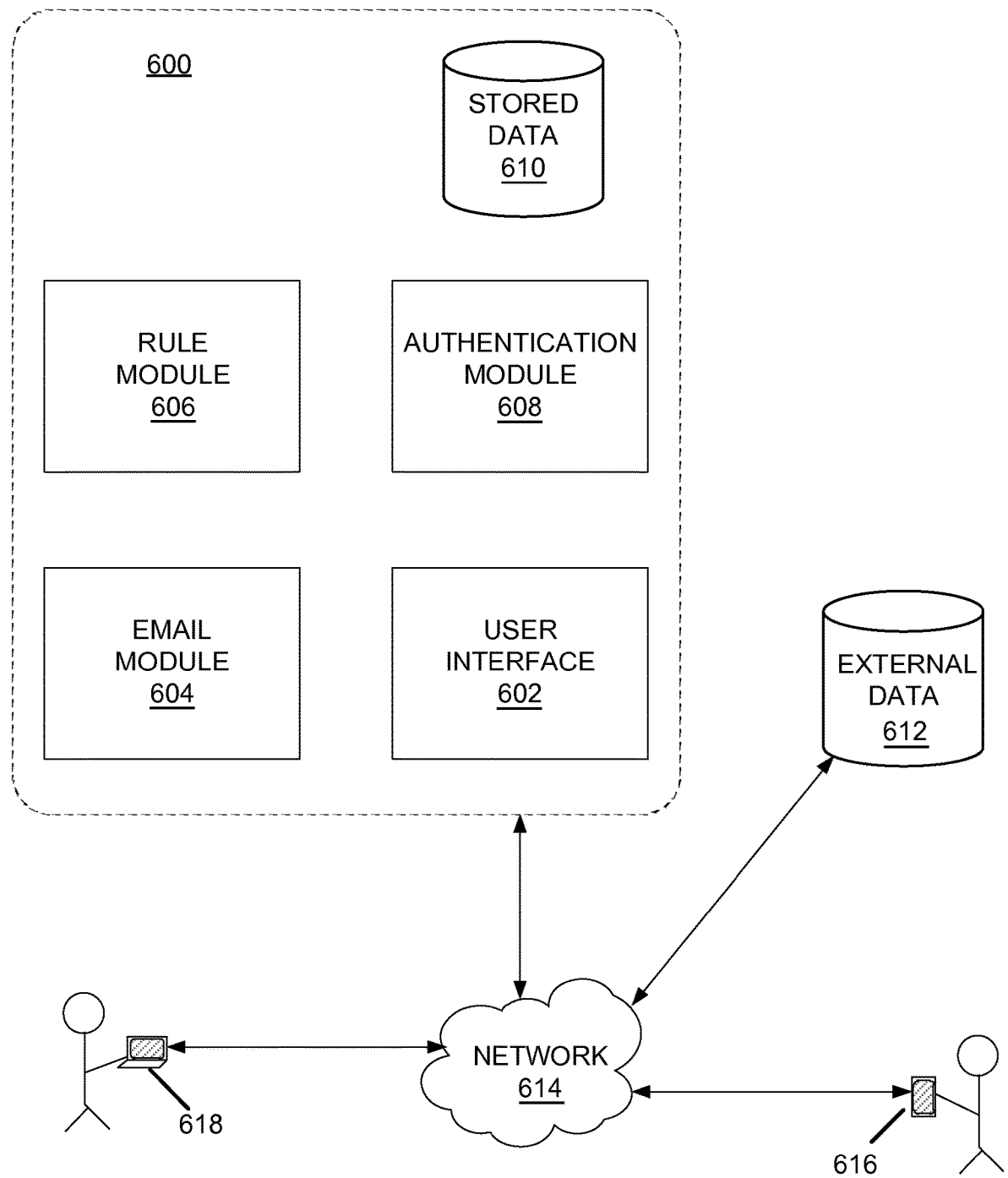
FIG. 6 depicts an example simplified form interface system, according to one embodiment.

Referring now also to FIG. 6, an example system 600 for the simplified form interface is presented. The system 600 can be part of an electronic workflow system. The system 600 can include a user interface module 602. For example, the user interface module 602 can serve web pages across the Internet 614, or any other suitable network, to a desktop, laptop, or tablet computing device 618 that is executing a web browser such as Internet Explorer™. In another example, the user interface module 602 can respond to dedicated apps executing on mobile computing devices 616. The system 600 can include an email module 604 to support email-based transactions such as the one described with respect to FIG. 5. Other types of interface and support modules can also be used.

The system can include a rule module 606. The rule module 606 can load rules associated with a particular form from a database 610 and perform data checking of the data entered into the fields and data entry fields of the forms and simplified form interfaces. Administrators can upload forms and create/modify rules for forms. The form and rules can be stored in the database. Data entered into forms and simplified form interfaces can be stored in the database, as can any associated metadata.

The system can optionally include an authentication module 608 to authenticate users. Authentication techniques can include password, encryption, certificates, key management, and other authentication techniques known or yet to be developed as would be understood by one of ordinary skill in the art.

Figure 7:
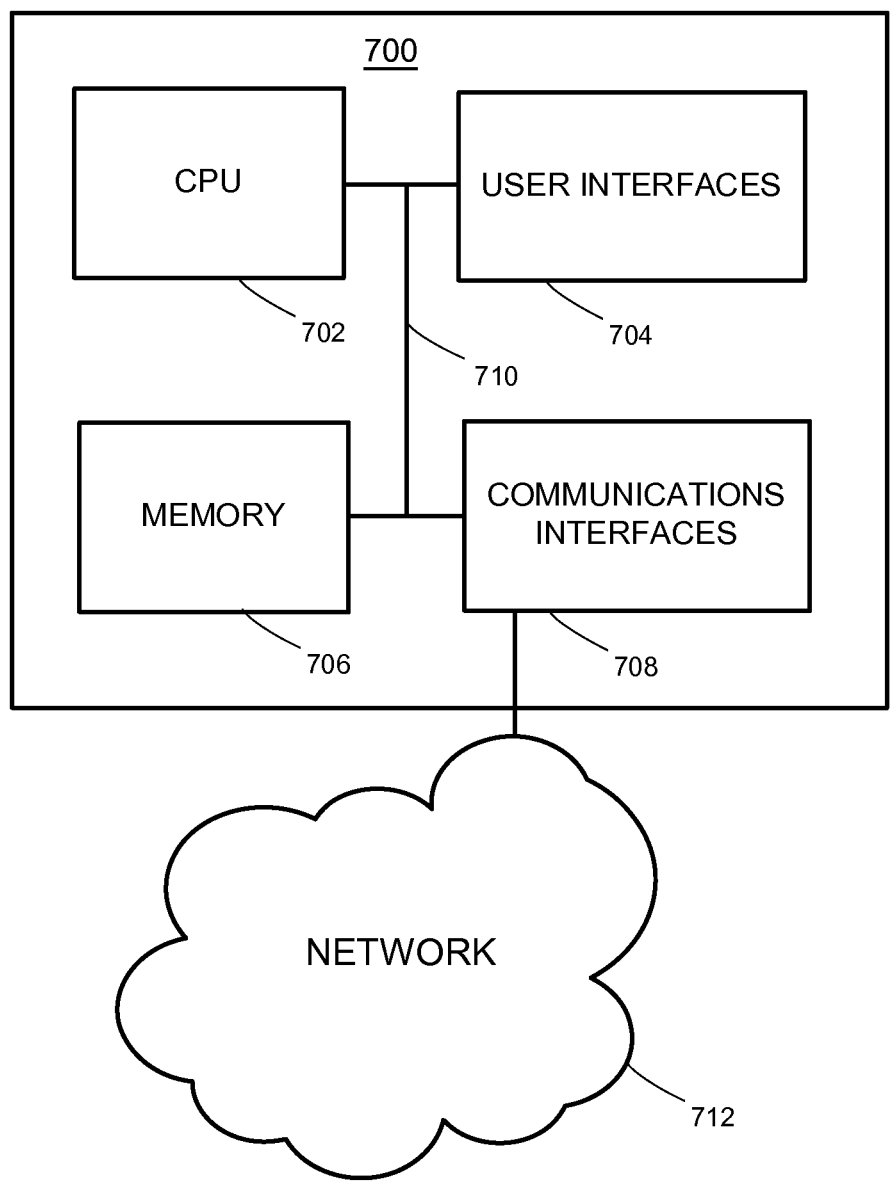
FIG. 7 depicts an example computing device, according to one embodiment.

Referring now to FIG. 7, an example computing device 700 is presented. The processes described herein can be performed on or between one or more computing devices 700. A computing device 700 can be a server, a computing device that is integrated with other systems or subsystems, a mobile computing device, a cloud-based computing capability, and so forth. For example, the computing device 700 can be a personal computing device of the user, a mobile computing device such as the ones depicted in FIGS. 3 and 4, and so forth. The computing device 700 can be any suitable computing device as would be understood in the art, including without limitation, a custom chip, an embedded processing device, a tablet computing device, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

Each computing device 700 includes one or more processors 702 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 700 also includes one or more memories 706, for example read only memory (ROM), random access memory (RAM), cache memory associated with the processor 702, or other memories such as dynamic RAM (DRAM), static RAM (SRAM), programmable ROM (PROM), electrically erasable PROM (EEPROM), flash memory, a removable memory card or disk, a solid state drive, and so forth. The computing device 700 also includes storage media such as a storage device that can be configured to have multiple modules, such as magnetic disk drives, floppy drives, tape drives, hard drives, optical drives and media, magneto-optical drives and media, Compact Disc (CD) drives, Compact Disc Read Only Memory (CD-ROM), Compact Disc Recordable (CD-R), Compact Disc Rewriteable (CD-RW), a suitable type of Digital Versatile Disc (DVD) or BluRay™ disc, and so forth. Storage media such as flash drives, solid state hard drives, redundant array of individual disks (RAID), virtual drives, networked drives and other memory means including storage media on the processor 702, or memories 706 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 708 can be configured to transmit to, or receive data from, other computing devices 700 across a network 712. The network and communication interfaces 708 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 708 can include wired data transmission links such as Ethernet and TCP/IP. The communication interfaces 708 can include wireless protocols for interfacing with private or public networks 712. For example, the network and communication interfaces 708 and protocols can include interfaces for communicating with private wireless networks 712 such as a WiFi network, one of the IEEE 802.11x family of networks, or another suitable wireless network. The network and communication interfaces 708 can include interfaces and protocols for communicating with public wireless networks 712, using for example wireless protocols used by cellular network providers, including Code Division Multiple Access (CDMA) and Global System for Mobile Communications (GSM). A computing device 700 can use network and communication interfaces 208 to communicate with hardware modules such as a database or data store, or one or more servers or other networked computing resources. Data can be encrypted or protected from unauthorized access, for example by using secure sockets, virtual private networks, and so forth.

The computing device 700 can include a system bus 710 for interconnecting the various components of the computing device 700, or the computing device 200 can be integrated into one or more chips such as programmable logic device or application specific integrated circuit (ASIC). The system bus 710 can include a memory controller, a local bus, or a peripheral bus for supporting input and output devices associated with the user interfaces 704, and communication interfaces 708. Example input and output devices include keyboards, keypads, gesture or graphical input devices, motion input devices, touchscreen interfaces, one or more displays, audio units, voice recognition units, vibratory devices, computer mice, and any other suitable user interface.

The processor 702 and memory 706 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

Figure 8:
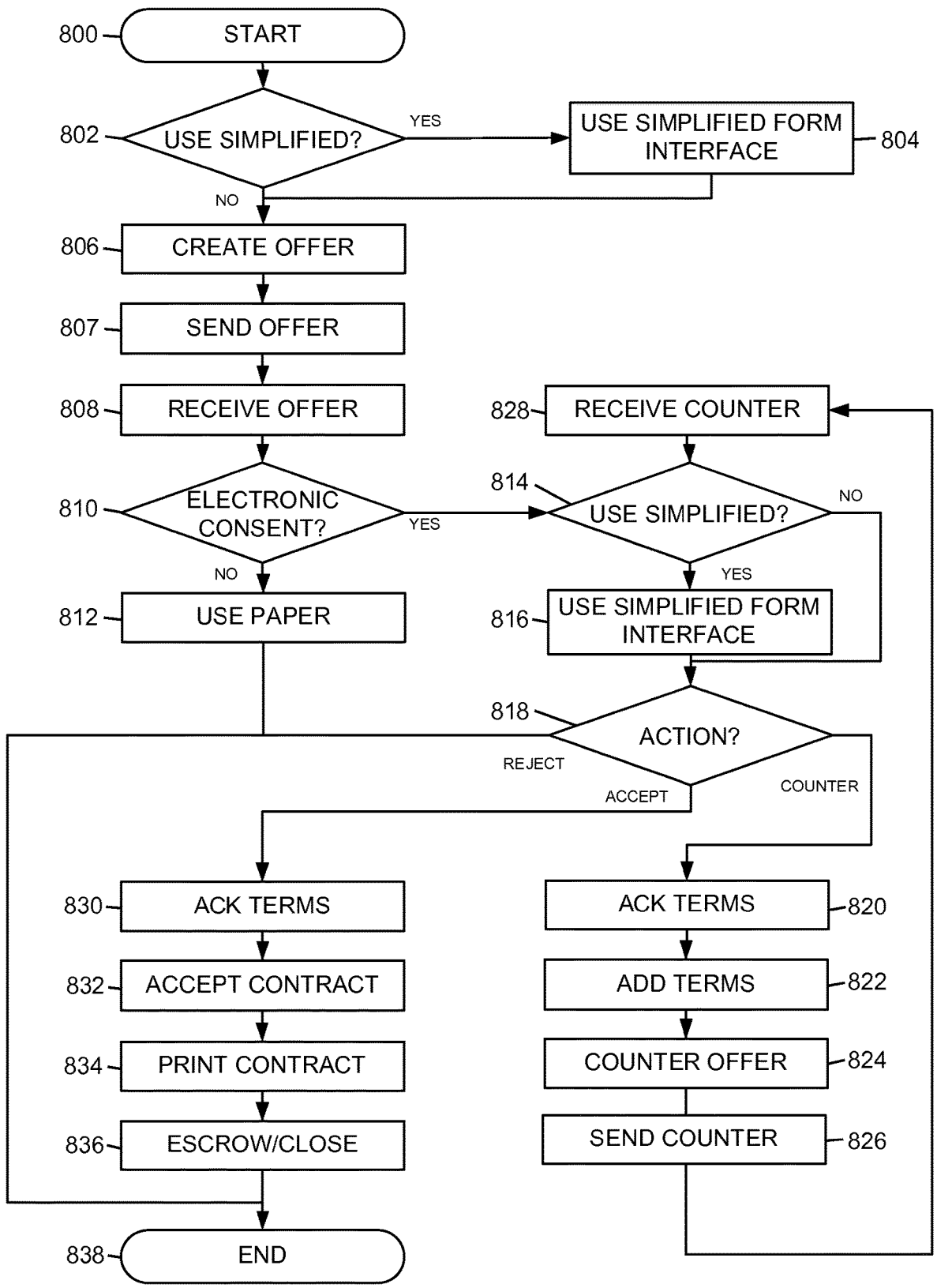
FIG. 8 depicts example operations of a simplified form interface system, according to one embodiment.

Referring now to FIG. 8, example operations of a simplified form interface system are presented. Processing starts at start block 800 when a party, such as a potential buyer, begins to use a system such as an electronic workflow system and is presented with the option to use the simplified form interface. Processing continues to decision block 802.

In decision block 802, if the party opts to use the simplified form interface, then processing continues to process block 804, otherwise processing continues to process block 806.

In process block 804, the party uses the simplified form interface as described above. For example, the party can be a buyer that intends to make an offer for a property that is for sale by a seller. The buyer can be presented with a simplified form interface, for example a web interface such as the one described for FIG. 2 above. Processing continues to process block 806.

In process block 806, the buyer can create an offer by entering the terms of the offer into the appropriate fields, if using a form, or data entry fields if using the simplified form interface, as described above. In a configuration, the party can toggle between the simplified form interface and the form such as is described for FIG. 1 above. Processing continues to process block 807.

In process block 807, the party can send the offer to another party using a suitable communication means. For example, the buyer can send the seller the offer that was created in process block 806. In a configuration, the buyer sends the seller the offer using a link to offer on the electronic workflow system. In other configuration, the seller is also a user of the electronic workflow system and the offer is communicated through the electronic workflow system. Other suitable communications means, such as email, electronic messaging, and so forth can be similarly used to communicate the offer to the seller. Processing continues to process block 808.

In process block 808, the other party receives the offer. For example, the other seller can receive a PDF of the offer and/or a link to the offer. The link can be a hyperlink to the offer on the electronic workflow system. The seller can be presented with the option to negotiate the offer electronically, for example using the electronic workflow system. Processing continues to decision block 810.

In decision block 810, if the other party consents to negotiating the offer electronically, then processing continues to decision block 814. Otherwise, processing continues to process block 812.

In process block 812, the parties use paper documents or an equivalent to negotiate the offer, instead of using the simplified form interface and/or electronic workflow system. Processing then terminates at end block 838.

In decision block 814, if the party has decided to use the simplified form interface, then processing continues to process block 816, otherwise processing continues to decision block 818.

In process block 816, the party uses the simplified form interface as described above. For example, the party can be a seller that negotiates with the buyer for a property that is for sale by the seller. The buyer can be presented with a simplified form interface, for example a web interface such as the one described for FIG. 2 above. Processing continues to decision block 818.

In decision block 818, if the party rejects the offer, then processing terminates at end block 838. If the party accepts the offer, then processing continues to process block 830. If the party counter offers the other party, then processing continues to process block 820. For example, the seller may desire to negotiate with the buyer regarding the terms of the sale of the property, or may need to make additional legal disclosures prior to accepting an offer from a potential buyer.

In process block 820, the party may be required to acknowledge certain terms in the offer. For example, a buyer may be required to acknowledge that the buyer has received a lead paint disclosure form from the seller, or acknowledge that certain items attached to the house are specifically not included in the sale of the house. A seller can be required to acknowledge that the sale could be contingent upon an inspection of the house, or that the seller has disclosed all known problems with the property. Other acknowledgements, including those required by code or law, can also be required. The party can acknowledge required terms of the offer. The simplified form interface can advantageously permit a party to acknowledge a number of terms with a single press of a button. Processing continues to process block 822.

In process block 822, the party can add terms to the contract. For example a buyer might add a term that the sale would be contingent upon the buyers being able to sell their existing home at or above a particular price within a specified period of time. The simplified form interface advantageously can group together related fields, as illustrated in FIG. 2, thereby making it easier for a party to see relating information all in the same place in the user interface. Processing continues to process block 824.

In process block 824, a party can change a term presented by the other party to a more desirable value. In a configuration, the party can overwrite the other party's term with a new value. In a configuration, the changed term can be annotated, for example using a track changes type system to visually notify the other party of the change. For example, a buyer can change the offer price for a house in the form to a lower number than the price set by the seller. Processing continues to process block 826.

In process block 826, the counter offer can be sent to the other party. In the configuration, the counter offer can be sent using a link to the updated offer, or counter-offer. In a configuration, the system can send a link, email, or message to the other party that includes just the changes made by the other party. For example, similar to the screen shot illustrated in FIG. 4, an email can be generated that is sent to the other party to approve that includes just the changes to be accepted by the other party. Other types of communications, alerts, and notifications can be sent, and can include a variety of potential response options by the other party as would be understood by one of ordinary skill in the art. Processing continues to process block 828.

In process block 828, the other party can receive the offer. As described above in process block 826, the offer can be sent in any number of ways using any number of communication types. Processing continues to decision block 814.

In process block 830, if the party has accepted the offer in decision block 818, then the party may optionally need to acknowledge certain terms in the offer similar to process block 820. For example, a buyer may accept a seller's offer for a sale of a property, but may still need to acknowledge receipt of a lead based paint disclosure by the seller prior to being allowed to accept the terms of the contract by the system. Processing continues to process block 832.

In process block 832, the party accepts the offer from the other party. For example, the party can select an accept offer button as is described with regard to FIG. 5. In various configurations, the system can require additional confirmation steps or authentication of the party. Authentication methods can include those methods described with regard to the authentication module of FIG. 6. For example, a state may have a legal requirement that a form be physically signed and authenticated by a licensed real estate agent. Processing continues to process block 834.

In process block 834, the form and data entered into fields associated with the form can optionally be printed out or otherwise saved, for example as a PDF in a cloud server. Processing continues to process block 836.

In process block 836, monies and the deeds to the property can be placed in the trust of an escrow agent, monies and properties can be exchanged between parties, and the deal can be closed. Processing terminates at end block 838.

Generally, the operations described in process blocks and decision blocks 802 through 836 can be performed in any suitable order to achieve a desired workflow, as would be understood by one of ordinary skill in the art.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semi-permanent, and/or semi-temporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

Some of the figures can include a logic flows. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A method for simplifying visual organization of form information, the method comprising:
   by a form simplification server, causing to be displayed on a remote computing device a virtual transaction form that comprises a first visual representation of a first plurality of editable input fields and a first visual representation of a second editable input field;
   receiving, by the form simplification server, a request to view a simplified version of the virtual transaction form sent by the remote computing device; and
   generating a simplified virtual transaction form, wherein the simplified virtual transaction form comprises a second visual representation of the first plurality of editable input fields of the virtual transaction form, wherein the second visual representation of the first plurality of editable input fields of the virtual transaction form is a single editable input field such that there is a one-to-many correspondence of the single editable input field of the simplified virtual transaction form to the first plurality of editable input fields of the virtual transaction form, and a second visual representation of the second editable input field of the virtual transaction form, wherein the second visual representation of the second editable input field of the virtual transaction form comprises multiple editable input fields such that there is a many-to-one correspondence of the multiple editable input fields of the simplified virtual transaction form to the first visual representation of the second editable input field of the virtual transaction form, wherein the second visual representation of the first plurality of editable input fields is visually distinct from the first visual representation of the first plurality of editable input fields, and wherein the second visual representation of the second editable input field is visually distinct from the first visual representation of the second editable input field.

2. The method of claim 1, wherein the virtual transaction form is an electronic representation of a corresponding physical transaction form and is visually similar to the physical transaction form.

3. The method of claim 1, wherein the virtual transaction form comprises a virtual real estate transaction form.

4. The method of claim 1, wherein a file format of the virtual transaction form is one of a portable document format and a word processor document format.

5. The method of claim 1, wherein generating the simplified virtual transaction form comprises:
   determining, by the form simplification server, whether a first user-specified data element corresponding to a first editable input field of the first plurality of editable input fields is stored in a data store;
   retrieving, by the form simplification server, the first user-specified data element in response to a determination that the first user-specified data element corresponding to the first editable input field is stored in the data store; and
   populating, by the form simplification server, a third editable input field of the simplified virtual transaction form with the retrieved first user-specified data element.

6. The method of claim 1, further comprising:
receiving, by the form simplification server and from the remote computing device, a first user-specified data element input into the first editable input field of the virtual transaction form;
storing, by the form simplification server, the received first user-specified data element in a record of a data store that corresponds to the first editable input field of the virtual transaction form; and
populating, by the form simplification server and subsequent to receiving the request, a third editable input field of the simplified virtual transaction form with the received and stored first user-specified data element.

7. The method of claim 1, further comprising:
receiving, by the form simplification server and from the remote computing device, a first user-specified data element input into a third editable input field of the simplified virtual transaction form;
storing, by the form simplification server, the received first user-specified data element in a record of a data store that corresponds to the third editable input field of the simplified virtual transaction form;
receiving, by the form simplification server and from the remote computing device, a request to view the virtual transaction form; and
populating, by the form simplification server, the first editable input field of the virtual transaction form with the received and stored first user-specified data element.

8. The method of claim 7, further comprising:
applying, by the form simplification server, a rule to the received first user-specified data element, wherein the rule specifies population and storage conditions for received user-specified data element; and
wherein storing the received first user-specified data element in the record of the data store and populating the first editable input field of the virtual transaction form comprises storing the received first user-specified data element in the record of the data store and populating the first editable input field of the virtual transaction form based on application of the rule to the received first user-specified data element.

9. The method of claim 1, further comprising:
receiving, by the form simplification server and from the remote computing device, a first user-specified data element input into a third editable input field of the simplified virtual transaction form; and
determining, by the form simplification server, whether a second user-specified data element corresponding to the first editable input field of the virtual transaction form is stored in a data store;
storing, by the form simplification server and in response to determining that a second user-specified data element corresponding to the first editable input field of the virtual transaction form is not stored in the data store, the received first user-specified data element in a record of a data store that corresponds to the third editable input field of the simplified virtual transaction form; and
populating, by the form simplification server, the first editable input field of the virtual transaction form with the received and stored first user-specified data element.

10. The method of claim 1, wherein a third editable input field and a fourth editable input field of the simplified virtual transaction form are visually organized based on relevance.

11. The method of claim 1, further comprising determining, by the form simplification server, a format with which to visually organize third and fourth editable input fields of the simplified virtual transaction form based on at least one characteristic of a communication medium across which the remote computing device and the form simplification server communicate.

12. The method of claim 1, further comprising:
causing to be displayed, on the remote computing device, an option to use a simplified form interface.

13. A system for simplifying visual organization of form information, the system comprising:
a form simplification server comprising a processor configured to execute instructions stored in memory, wherein the instructions cause the processor to:
cause display of a virtual transaction form that comprises a first editable input field and a second editable input field, the first editable input field and second editable input field being visually organized in a first format;
receive a request to view a simplified version of the virtual transaction form sent by a remote computing device; and
generate a simplified virtual transaction form, wherein the simplified virtual transaction form comprises a third editable input field that corresponds to the first editable input field of the virtual transaction form and multiple editable input fields that corresponds to the second editable input field of the virtual transaction form such that there is a many-to-one correspondence of the multiple editable input fields of the simplified virtual transaction form to the second editable input field of the virtual transaction form, wherein the third editable input field of the simplified virtual transaction form is visually organized in a second format different from the first format.

14. The system of claim 13, wherein generating the simplified virtual transaction form comprises:
determining whether a first user-specified data element that corresponds to the first editable input field is stored in a data store;
retrieving the first user-specified data element in response to a determination that the first user-specified data element corresponds to the first editable input field is stored in the data store; and
populating the third editable input field of the simplified virtual transaction form with the retrieved first user-specified data element.

15. The system of claim 13, wherein the instructions further cause the processor of the form simplification server to:
receive, from the remote computing device, a first user-specified data element input into the first editable input field of the virtual transaction form;
store the received first user-specified data element in a record of a data store that corresponds to the first editable input field of the virtual transaction form; and
populate, subsequent to receiving the request, the third editable input field of the simplified virtual transaction form with the received and stored first user-specified data element.

16. A method for simplifying visual organization of form information, the method comprising:
by a form simplification server, causing to be displayed a virtual transaction form that comprises a first editable input field, a first description element visually associated with the first editable input field, a second editable input field, and a second description element visually associated with the second editable input field, wherein the first editable input field, the first description element, the second editable input field, and the second description element are visually organized in a first format; and generating, by the form simplification server, a simplified virtual transaction form, wherein the simplified virtual transaction form comprises a third editable input field corresponding to the first editable input field of the virtual transaction form and multiple editable input fields corresponding to the second editable input field of the virtual transaction form such that there is a many-to-one correspondence of the multiple editable input fields of the simplified virtual transaction form to the second editable input field of the virtual transaction form, and wherein the third editable input field of the simplified virtual transaction form is visually organized in a second format that is different from the first format and that excludes the first description element.

17. The method of claim 16, wherein generating the simplified virtual transaction form comprises:
determining, by the form simplification server, whether a first user-specified data element corresponding to the first editable input field is stored in a data store;
retrieving, by the form simplification server, the first user-specified data element in response to a determination that the first user-specified data element corresponding to the first editable input field is stored in the data store; and
populating, by the form simplification server, the third editable input field of the simplified virtual transaction form with the retrieved first user-specified data element.

18. The method of claim 16, further comprising:
receiving, by the form simplification server and from a remote computing device, a first user-specified data element input into the first editable input field of the virtual transaction form;
storing, by the form simplification server, the received first user-specified data element in a record of a data store that corresponds to the first editable input field of the virtual transaction form; and
populating, by the form simplification server and subsequent to receiving a request to view a simplified version of the virtual transaction form, the third editable input field of the simplified virtual transaction form with the received and stored first user-specified data element.

19. The method of claim 16, further comprising:
receiving, by the form simplification server and from a remote computing device, a first user-specified data element input into the third editable input field of the simplified virtual transaction form;
storing, by the form simplification server, the received first user-specified data element in a record of a data store that corresponds to the third editable input field of the simplified virtual transaction form;
receiving, by the form simplification server and from the remote computing device, a request to view the virtual transaction form; and
populating, by the form simplification server, the first editable input field of the virtual transaction form with the received and stored first user-specified data element.

20. The method of claim 19, further comprising:
applying, by the form simplification server, a rule to the received first user-specified data element, wherein the rule specifies population and storage conditions for received user-specified data element; and
wherein storing the received first user-specified data element in the record of the data store and populating the first editable input field of the virtual transaction form comprises storing the received first user-specified data element in the record of the data store and populating the first editable input field of the virtual transaction form based on application of the rule to the received first user-specified data element.

21. The method of claim 16, further comprising determining, by the form simplification server, the second format with which to visually organize the third editable input field and a fourth editable input field of the simplified virtual transaction form based on at least one characteristic of a communication medium across which a remote computing device and the form simplification server communicate.

22. The method of claim 16, further comprising:
causing a view toggle control to be displayed with the virtual transaction form; and
receiving, by the form simplification server, a request to view a simplified version of the virtual transaction form, wherein the request is sent by a remote computing device in response to user activation of the view toggle control displayed with the virtual transaction form.

* * * * *